(12) United States Patent
Mendonsa et al.

(10) Patent No.: US 11,294,593 B2
(45) Date of Patent: Apr. 5, 2022

(54) CARTRIDGE-EXTERNAL PREAMPLIFIER FOR READ/WRITE CONTROL OF MEDIA LIBRARY

(71) Applicant: Seagate Technology LLC, Fremont, CA (US)

(72) Inventors: Riyan Alex Mendonsa, Minneapolis, MN (US); Jon D Trantham, Chanhassen, MN (US); Peng Peng, Eden Prairie, MN (US); Brett R. Herdendorf, Mound, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/360,760

(22) Filed: Jun. 28, 2021

(65) Prior Publication Data

US 2021/0326062 A1 Oct. 21, 2021

Related U.S. Application Data

(62) Division of application No. 16/696,793, filed on Nov. 26, 2019, now abandoned.

(51) Int. Cl.
| | |
|---|---|
| G11B 5/40 | (2006.01) |
| G06F 3/06 | (2006.01) |
| G11B 5/455 | (2006.01) |
| G11B 33/12 | (2006.01) |
| G11B 5/02 | (2006.01) |

(52) U.S. Cl.
CPC .......... *G06F 3/0658* (2013.01); *G06F 3/0604* (2013.01); *G06F 3/0686* (2013.01); *G11B 5/455* (2013.01); *G11B 33/126* (2013.01); *G11B 5/02* (2013.01)

(58) Field of Classification Search
None
See application file for complete search history.

(56) References Cited

U.S. PATENT DOCUMENTS

| | | | |
|---|---|---|---|
| 7,839,604 B1 | 11/2010 | Coffee et al. | |
| 10,146,186 B2 | 12/2018 | Yamamoto | |
| 10,152,105 B2 | 12/2018 | Jurey | |
| 10,467,172 B2 * | 11/2019 | Shaw, II | G06F 13/4068 |
| 10,818,318 B2 | 10/2020 | Herdendorf | |
| 10,902,879 B2 | 1/2021 | Mendonsa | |
| 10,996,900 B2 | 5/2021 | Mendonsa | |
| 2003/0043508 A1 | 3/2003 | Schulz | |
| 2009/0195935 A1 | 8/2009 | Choi | |
| 2015/0170690 A1 * | 6/2015 | Contreras | G11B 5/486 360/264.2 |
| 2015/0362983 A1 * | 12/2015 | Frick | G06F 1/28 713/324 |
| 2016/0253108 A1 | 9/2016 | Jurey | |
| 2017/0242613 A1 | 8/2017 | Shaw, II | |
| 2017/0351632 A1 * | 12/2017 | Shaw, II | G06F 13/1694 |

* cited by examiner

*Primary Examiner* — William J Klimowicz

(74) *Attorney, Agent, or Firm* — Holzer Patel Drennan

(57) ABSTRACT

A storage system includes a media player including a preamplifier that is adapted to provide data access to a storage cartridge lacking an independent read/write preamplifier. The media player couples to the storage cartridges across an interconnect, and the storage cartridge is adapted to perform data access operations responsive to signals received from the media player through the interconnect.

19 Claims, 7 Drawing Sheets

CARTRIDGE-EXTERNAL PREAMPLIFIER FOR READ/WRITE CONTROL OF MEDIA LIBRARY

CROSS-REFERENCE

This application is a divisional application of U.S. patent application Ser. No. 16/696,793 filed Nov. 26, 2019 titled CARTRIDGE-EXTERNAL PREAMPLIFIER FOR READ/ WRITE CONTROL OF MEDIA LIBRARY, the entire disclosure of which is incorporated herein by reference for all purposes.

SUMMARY

A storage system includes a media player that couples to a storage cartridge across an interconnect. The media player includes a preamplifier that inputs and outputs electrical signals across the interconnect. The storage cartridge lacks an independent read/write preamplifier but is controlled via the interconnect to perform data storage operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Figure 1:
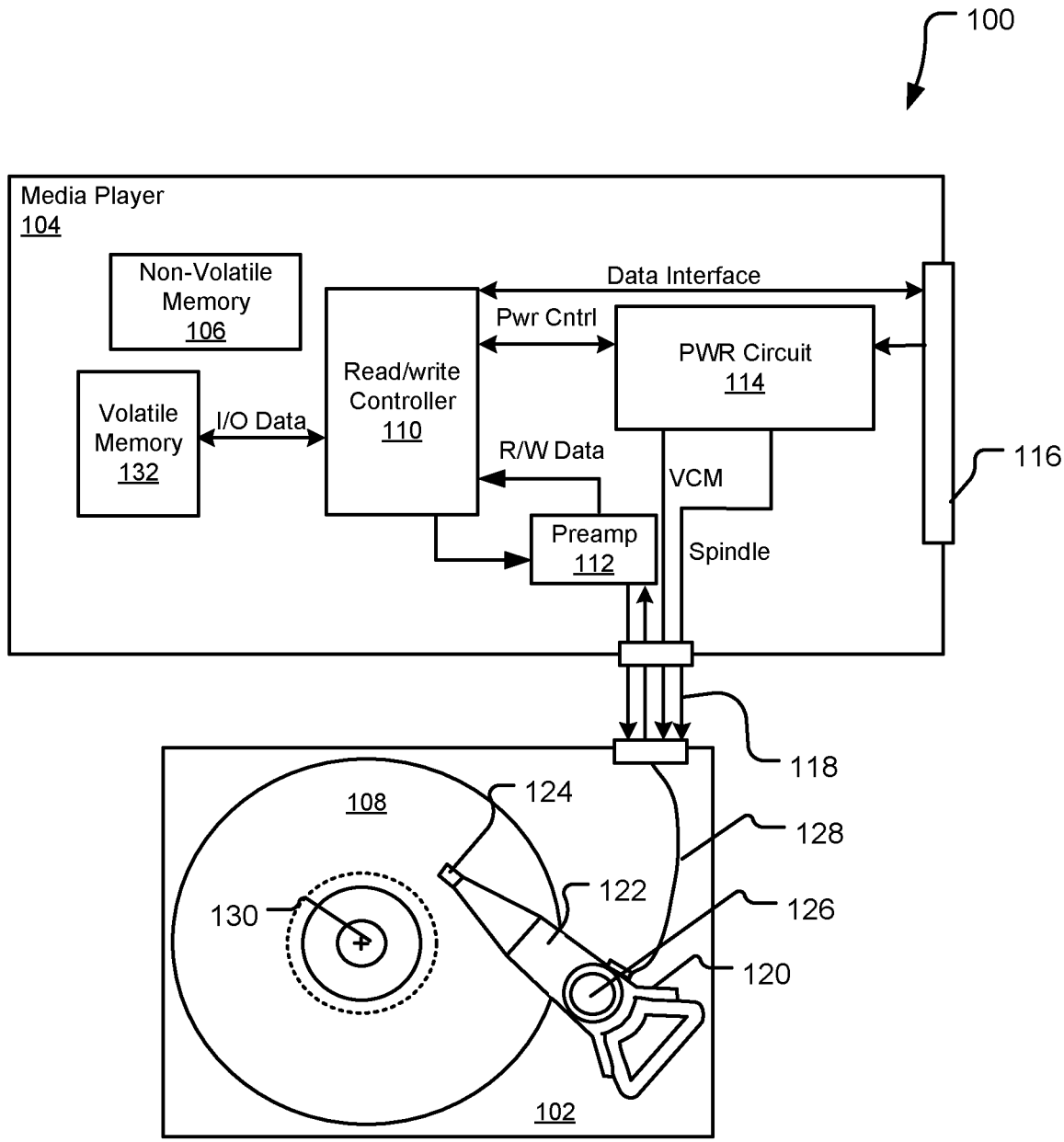
FIG. 1 illustrates an example disk-based storage system in which a preamplifier has been displaced from a traditional position (e.g., internal to a storage cartridge or within the head disk assembly of a hard disk drive) to a position external to the storage cartridge that is within a media player.

The growing use of cloud-based storage solutions has driven demand for low-cost data storage systems capable of retaining large volumes of data. However, as the amount of stored data continues to increase exponentially, so too does the difficulty in ensuring access to data at speeds acceptable to both service providers and end users. In light of this, storage centers (e.g., cloud-based storage providers) drive demand for storage devices with high storage density, high throughput, and low cost. In most designs, these throughput and cost are mutually exclusive and increasing throughput (e.g., the amount of data read or written in a set amount of time) cannot be achieved without also increasing storage device manufacturing costs.

In some archival storage systems, data is stored in enclosures (referred to herein as "storage cartridges" or "cartridges") that include one or more physical storage media (e.g., disks or SSDs). These cartridges lack at least some of the read/write control circuitry and mechanics that are included in a more traditional stand-alone storage device (e.g., an external hard drive). In some of these systems, the cartridges are designed to be physically mated with a media player that includes power circuitry and read/write control circuitry. For example, the cartridges may be capable of physically coupling to and decoupling from a media player such that a single set of control electronics in the media player can be used to read multiple (e.g., hundreds or thousands) of different cartridges.

In these cartridge-based archival systems, the exact division of control electronics between the cartridge and media player may vary from one implementation to another. However, in one implementation, the media player includes circuitry that receives and generates read and write signals along with instructions that may be interpreted by a preamplifier to control ancillary signals and switches/multiplexers required to connect the read and write signals to the desired recording head. These generated read signals, write signals, and instructions are sent via an electrical interface through a connection port to a select storage cartridge to a preamplifier internal to the select storage cartridge. The preamplifier may, for example, include various amplifiers, driver circuits, and/or switches and/or multiplexers for coupling read/write component signals along corresponding traces to respective subcomponents on one or more read/write heads. For example, the preamplifier may receive a command to select a particular recording head or to activate a circuit to the desired head in response to the command. Additionally, the preamplifier may also be commanded to control ancillary circuitry required for data storage. For example, the preamplifier may generate a current to one or more heater elements of the selected recording head to thermally expand target head regions and thereby provide fine control of head-to-disk spacing, signal(s) to control micro actuators to provide fine radial motion control of the head, and bias currents for the reader elements.

In the above-described systems, the preamplifier internal to the storage cartridge contributes significantly to the manufacturing cost of each storage cartridge. In some cases, the preamplifier cost may be as much as 10% or more of the total manufacturing costs of the storage cartridge. Thus, the ability to remove the preamplifier from the storage cartridge and place it in the media player could have a dramatic cost-reducing impact on a massive library-style cartridge storage system (e.g., by replacing potentially thousands of cartridge-internal preamplifiers with a single preamplifier in the media player that may be shared by all storage cartridges).

Despite this evident potential cost savings, it has been previously thought by many industry experts that, for several reasons, it is functionally essential for the preamplifier to remain within the storage cartridge where it is in close proximity to the head gimbal assembly (HGA) that supports the read and write elements. The read and write signals are generated in the preamplifier at very high frequencies (e.g., GHz range). Moving the preamplifier out of the storage cartridge has the effect of dramatically increasing (e.g., by a factor of 3 or more) the travel distance read/write signals traverse between the HGA and the preamplifier. Using traditional techniques, the high-frequency read/write signals are degraded along this longer path due to high-frequency signal attenuation and an increase in coupled noise correlated with path length.

In addition to presenting new obstacles in noise mitigation, displacing the preamplifier from the storage cartridge decreases the rise time for each current pulse that is sent to the HGA. It is generally believed that accurate writing (e.g., accurately targeting bits to transition in magnetic polarity) depends, at least in part, on the ability to generate a write current with pulses that have sufficiently high (fast) rise times. Therefore, moving the preamplifier external to the storage cartridge further entails derivation of a solution that either keeps rise time high or that compensates for a loss in rise time. Still further, another reason to keep the preamplifier internal to the storage cartridge is to protect the HGA from electrostatic discharge (ESD) events (shocks) that may damage the especially fragile read/write elements.

The herein disclosed technology provides a cartridge-based storage solution that addresses all of the forgoing and thereby facilitates displacement of the preamplifier from a position internal to the storage cartridge to a position external to the storage cartridge. This dramatically reduces systems manufacturing costs without a corresponding reduction in read and write throughput.

FIG. 1 illustrates an example disk-based storage system 100 in which a preamplifier has been displaced from a traditional position (e.g., internal to a storage cartridge 102) to a position external to the storage cartridge 102 that is within a media player 104. The media player 104 couples with the storage cartridge 102 to read data from and write data to a storage media 108.

By example and without limitation, the exemplary storage cartridge 102 is a portable storage cartridge that resembles a conventional hard drive disk (HDD), but without certain mechanical and electrical features that would otherwise be necessary to enable the cartridge to operate in a stand-alone fashion. The various storage cartridges discussed herein may, for example, generally assume the form of an HDD minus control electronics and, in some cases, other elements that can be offloaded from the cartridge and supplied by the actuated media player, such as voice coil motor (VCM) magnets and spindle motor components. The removal of these elements from the individual cartridges in the library allows the provisioning of a large-scale, high-capacity storage system with the benefits of magnetic disk storage at a significantly lower cost.

Although a media player adapted to access the storage cartridge 102 may include different components in different implementations, the media player 104 is shown to include a read/write controller 110, a power circuit 114, volatile memory 132 (e.g., DRAM), non-volatile memory 106 (e.g., Flash), and a preamplifier 112. In one implementation, the read/write controller 110 includes a programmable processing core that utilizes firmware stored in the non-volatile memory 106 and volatile memory 132 to provide top-level control for the storage cartridge 102. In various implementations, the read/write controller 110 may include software or a combination of software and hardware, such as control instructions executed by one or more separate or shared device controllers (e.g., microprocessors), peripheral interface controllers ("PICs"), application-specific integrated circuits ("ASICs"), systems on chips ("SoCs"), etc.

In one implementation, the read/write controller 110 includes an SOC that communicates with an external controller to a host, such as a computer, a server, a rack controller, a storage array switch, etc. through a host connection interface 116. Communication between the host (not shown) and the media player 104 are digital or primarily digital, and accomplished via signal transmission between various compute nodes achieved via wired or wireless transmission protocols including, without limitation, one or more Serial Advanced Technology Attachment ("SATA"), Serial Attached Small Computer System Interface ("SAS"), Universal Serial Bus ("USB"), Peripheral Component Interconnect Express ("PCIe"), Non-Volatile Memory Express ("NVMe"), Ethernet, Kinetic, object storage protocols, wireless protocols, etc. Alternately, the device may contain internal support for full file-system or object-storage access entirely within itself, and may communicate files or objects (instead of blocks) to the host via host connection interface 116. In one implementation, the media player 104 has a hard-wired connection (e.g., cable) facilitating communications with the host, such as a rack-level controller (not shown). In another implementation, the media player 104 includes a transceiver and an antenna configured to wirelessly receive and respond to host commands over a local area network (LAN) or a wide area network (WAN).

In various different systems, the coupling between the media player 104 and the storage cartridge 102 may be permanent or temporary (e.g., designed for selective coupling and decoupling during normal use operations). In one implementation, the media player 104 is adapted to selectively couple with and uncouple from the storage cartridge 102. For example, the media player 104 may be designed to move (e.g., by way of robotically-actuation along rails or otherwise) relative to multiple storage cartridges in a library so as to selectively position itself for mating with select storage cartridge(s) through a connection interface 118. In another implementation, the media player 104 is designed to remain stationary within the storage system 100 while the storage cartridges (e.g., the storage cartridge 102) are moved into position for selective coupling to and decoupling from the media player 104. For example, the storage system 100 may include a robotic arm or other mechanism that attaches to and selectively ambulates individual storage cartridges from stowed storage positions on a rack and toward the media player 104 to facilitate a physical and electrical coupling between the media player 104 and storage cartridges. The media player may, for example, include a slot or other access station designed to receive and temporarily support the storage cartridge during a time while the media 108 is being accessed.

In still yet another implementation, the media player 104 and storage cartridge 102 are designed to remain in fixed positions relative to one another within the storage system. For example, the connection interface 118 may facilitate simultaneous electrical coupling to multiple different storage cartridges that share control electronics on the media player 104 and that may each be selectively and individually powered and accessed by the media player 104.

In one implementation, the media player 104 is designed to selectively couple with and provide data access to a single one of the storage cartridges at a time. In other implementations, the media player 104 is adapted to simultaneously couple to multiple storage cartridges at once (e.g., two or three adjacent cartridges) and to provide parallel data access operations to two or more of those storage cartridges.

The storage cartridge 102 includes a housing which encloses at least one rotatable recording medium (disk), such as a magnetic hard disk or a Heat-Assisted Magnetic Recording disk (HAMR), and at least one data read/write transducer (head), also referred to herein as a head-gimbal assembly (HGA). In FIG. 1, the storage cartridge 102 is shown to include a single disk; however, it is understood that the storage cartridge 102 may include multiple disks and multiple actuator arms and/or actuator assemblies. In some implementations, the media player 104 is designed to access data from other types of storage devices that are not disk-based, such as SSD media devices, tapes etc.

In some implementations, the storage cartridge 102 includes a sealed outer housing and each head is configured to be aerodynamically supported adjacent a magnetic recording surface of the corresponding disk by an air-fluid bearing established by high velocity rotation of the disk. The head(s) are radially advanced across the recording surface(s) using an actuator assembly 120 to rotate an actuator arm 122 that, in turn, supports a head gimbal assembly (HGA) 124 including one or more read elements and one or more write elements.

Each combination of HGA and disk surface is referred to as a head-disk interface (HDI), so the cartridges of the present disclosure can be characterized as HDI cartridges each having at least one HDI. The housing of each cartridge protects the HDI(s) from contaminants that may interfere with the operation of the cartridge. In some implementations where environmental controls are sufficiently in place to guard against contaminants, the cartridge may comprise housing such that the internal disks of one cartridge are exposed to the same environment as the internal disks of other cartridges in the system.

During read and write operations, the media 108 is selectively controlled by a spindle motor signal from the power circuit 114 to rotate about a spindle axis 130 while the actuator assembly 120 is selectively controlled by a voice coil motor (VCM) signal to physically actuate the actuator arm 122 about a pivot axis 126 and thereby move the HGA 124 radially across the media 108. Within the storage cartridge 102, signals in transit between the preamplifier 112 and the HGA 124 travel along a flexible electrical component referred to herein as a flex 128. The flex 128 includes a number of electrical traces along which control signals, read data, and write data may flow.

In one implementation where the media player 104 and the storage cartridge 102 are designed to selectively couple and decouple from one another, the read/write controller 110 instructs the power circuit 114 to provide power to the storage cartridge 102 responsive to detection of a coupling between the media player 104 and the storage cartridge 102. In response, the power circuit 114 shunts power from a power supply (not shown) to provide both VCM and spindle motor power signals, as shown.

In addition to commanding the power circuit 114, the read/write controller 110 may access firmware stored in the non-volatile memory 106 to retrieve operating protocols for the storage cartridge 102. In some implementations, these operating protocols may be received via transmission from a system host or other external processing device.

To read data from a target storage cartridge, the read/write controller 110 generates and transmits instructions, such as a head selection message, to the preamplifier 112. The preamplifier 112, in turn, selects via internal switches and/or multiplexers signals attached to reader elements of a select HGA (e.g., the HGA 124) to select and configure a read channel for transmitting read data back to the read/write controller 110.

Responsive to receipt of a corresponding instruction (e.g., a low-speed digital signal) from the read/write controller 110, the preamplifier 112 generates a small bias current, and the bias current is transmitted along a pair of reader lines down the length of the flex 128 to the HGA 124. A magnetoresistive (MR) sensor on the HGA 124 modulates this bias current at high frequencies (e.g., GHz range), and the modulated voltage travels back along the length of the flex 128 to the preamplifier 112 over the same reader lines. The preamplifier 112 amplifies the weak, modulated signal and transmits the signal back to the read/write controller 110 through the connection interface 118.

During a write operation, the read/write controller 110 sends a high-speed digital preamp control signal that instructs the preamplifier 112 to control the polarity of analog current flow through a write element of the HGA 124. In response, the preamplifier 112 generates and directs a high-frequency analog write signal through a transimpedance amplifier. This amplified analog write signal is routed down the length of the actuator arm 122 via the flex 128 to a write element on the HGA 124, where it affects the switching of current flow direction through a writer coil in the write element.

In addition to generating the high-frequency analog read and write signals and routing such signals to a select HGA (e.g., the HGA 124), the preamplifier 112 may also generate and/or sense various lower-bandwidth signals, such as signals for controlling one or more heaters on the select head, one or more micro actuators, etc.

The preamplifier 112 can be located within the media player 104 due to one or more adaptations to the storage cartridge 102 that are discussed with respect to the following figures. In one implementation, the flex 128 includes a number of traces that are impedance-matched to corresponding read and write elements on the HGA 124. This preserves signal quality by preventing signal reflection off the HGA 124. In the same or another implementation, the storage cartridge 102 includes an electrostatic discharge (ESD) protection mechanism (e.g., a switch or electrical shunt) that shields the HGA 124 from electrostatic shocks traditionally absorbed by an in-cartridge preamplifier. In still yet another implementation, the read/write controller 110 is tuned to adjust outgoing write signals in such a way that write errors do not increase as a result of the increased distance between the preamplifier 112 and the HGA 124. Further exemplary details of the above are discussed further with respect to FIG. 2-6 below.

Figure 2:
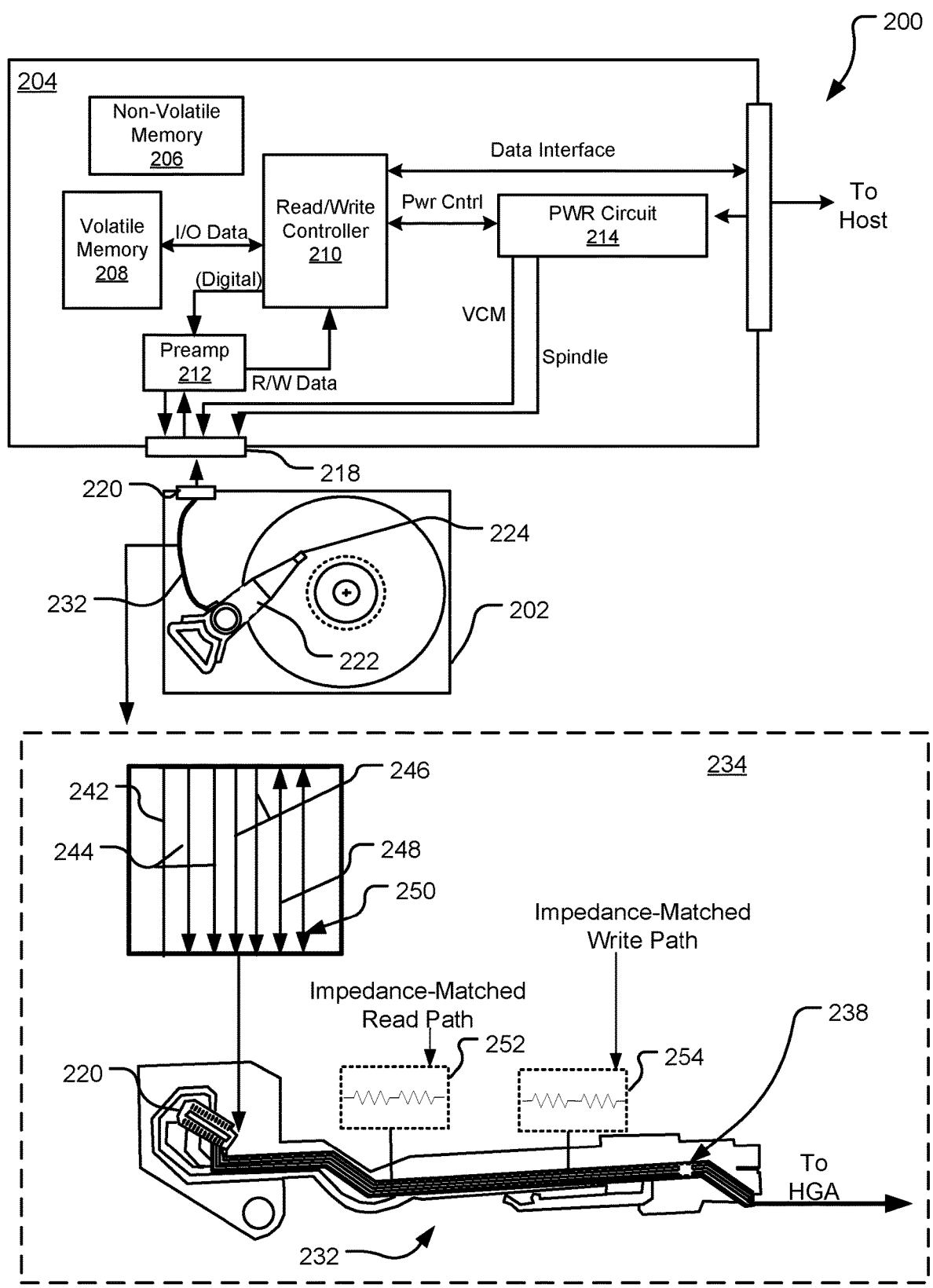
FIG. 2 illustrates another example storage system with a disk-based storage cartridge that does not include an internal read/write preamplifier.

FIG. 2 illustrates another example storage system 200 with a disk-based storage cartridge 202 that does not include an internal read/write preamplifier. As used herein, the term "read/write preamplifier" is used to refer to a preamplifier that is adapted to perform amplification of both read signals and write signals.

The storage system 200 includes a media player 204 that supports control circuitry for reading data from and writing data from the disk-based storage cartridge 202. By example and without limitation, the media player is shown to be a printed circuit board assembly (PCBA) including several circuitry components the same or similar to those described with respect to the media player 104 of FIG. 1, such as a read/write controller 210, preamplifier 212, power circuit 214, non-volatile memory 206, and volatile memory 208. Some implementations of the media player 204 may include fewer than all components or other components in lieu of or in addition to those shown in FIG. 2.

The media player 204 is designed to mate with the storage cartridge 202 through an interface formed by connection components 218 and 220. The read/write controller 210 on the media player 204 generates and transmits one or more preamp control signals to the preamplifier 212. Within the preamplifier 212, the preamp control signals are interpreted to configure various multiplexers and/or switches to establish appropriate channels to read or write data with a select HGA (e.g., the HGA 224). When these multiplexors and/or switches are configured, high-frequency analog read/write signals may travel between the HGA 224 and the media player 204 through the mated connection components 218, 220 and along a flex 232 that extends within the storage cartridge 202 from the connection port 220 all the way along the actuator arm 222 to an HGA 224 supporting one or more write elements.

To better illustrate features of the flex 232, an alternate view 234 (shown in dotted lines) illustrates the flex 232 in isolation of surrounding system elements. At a first end, the flex 232 includes the connector component 220 that is designed to mate with the connector component 218 of the media player 204.

The flex 232 includes several different electrical traces that extend from the connector component 220 all the way down the length of the flex 232 to corresponding components on the HGA 224. In traditional storage devices, the preamplifier 212 may be located within the storage cartridge 202 and on the flex 232, such as in an approximate position as indicated by the placeholder box 238. In these more traditional designs, analog write signals are generated and amplified in close proximity to the select write element. Likewise, weak read signals are amplified in close proximity to the select read element. Thus, the distance that the weak (pre-amplified) read and write signals have to travel is relatively short compared to the presently-illustrated design where the preamplifier 212 is located on the media player 204 external to the storage cartridge 202.

By example and without limitation, view 234 illustrates example uses for each of multiple different traces on the flex 232. Here, the example traces include a grounding trace 242, heater signal trace(s) 244, micro actuator signal traces 246, a pair of read signal traces 248, and a pair of write signal traces 250. In heat-assisted magnetic recording (HAMR) devices, an additional trace may be devoted to drive a laser diode that generates a laser beam to heat a media. In general, the grounding trace 242 is used to ground certain components of HGA 224. The read signal traces 248 are used to transmit a bias current from the preamplifier 212 to the read sensor on the HGA 224 and to transmit a high-frequency reader sensor signal from the HGA 224 to the preamplifier 212. The write signal traces 250 are used to send current to the writer element of the HGA 224 to magnetize the media (not shown). Heater traces 244 are used to carry electrical currents to heaters that may thermally protrude targeted areas on the HGA 224 to provide fine control of the fly height for the read and write elements. Microactuator traces 246 are used to carry microactuation voltages to corresponding microactuators on the HGA 224 to provide fine motion control (tracking) of the HGA 224. Different implementations may include different numbers of traces in addition to or in lieu of those shown. In one implementation, the flex 232 includes 13 different traces to carry signals to the HGA 224. Thus, it is to be appreciated that proposed design passes a large number of relatively weak analog component signals through the connection components 218 and 220 where previous designs used these ports for transmission/reception of a much stronger amplified signals.

To mitigate or prevent noise degradation that might otherwise obliterate or substantially degrade the relatively weak read and write signals passing through the connector components 218/220, the read signal traces 248 are designed to provide an impedance-matched read path 252 that matches the internal impedance of a corresponding read element on the HGA 224. Likewise, the write signal traces 250 are designed to provide an impedance-matched write path 254 that matches the internal impedance of a corresponding write element on the HGA 224. This impedance matching effectively prevents reflection of the read and write component signals along the associated traces (248 and 250) that could otherwise interfere with those signals.

In the system of FIG. 2, the amplification of read and write signals is performed by the preamplifier 212 within the media player 204 rather than within the cartridge 202. In one implementation, the preamplifier 212 receives digital signals from the read/write controller 210 that the preamplifier interprets to control the polarity of analog current transmitted to the magnetic write pole of the HGA. The preamplifier 212 may use switches/multiplexers to select between a plurality of writer circuits, and to send the write current to the selected write element.

The analog write current travels from the preamplifier 212, through the connector components 218/220, and along an impedance-matched write path 254 to the HGA. In one implementation, the impedance-matched write path 254 includes an impedance-controlled differential pair of lines.

On a read operation, the preamplifier 212 supplies a bias current to the desired reader element (selected via an internal switch) and this current is transmitted down an impedance-matched read path 252, which includes an impedance-controlled differential pair of lines, to an MR sensor on the HGA. The preamplifier 212 receives modulated voltages back from the MR sensor on the same reader pair, amplifies this received signal, and transmits the amplified signal back to the read/write controller 210.

Although the degree of impedance matching may vary from one implementation to another, one implementation of the system 200 provides for impedance-matching along the impedance-matched read path 252 and impedance-matched write path 254 to within 10% of the impedance of corresponding read and write elements.

Figure 3:
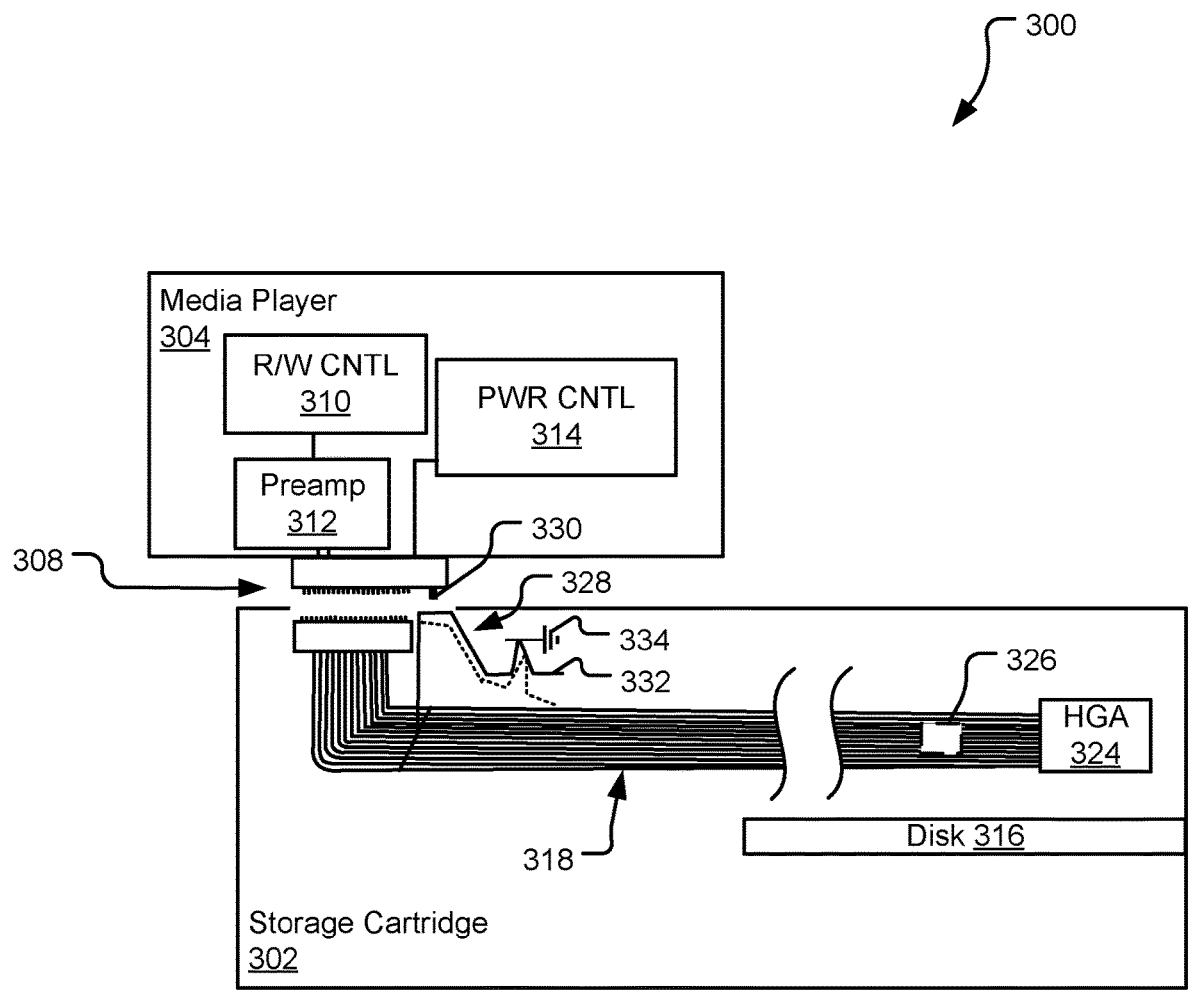
FIG. 3 illustrates still another example storage system including disk-based storage cartridges that do not include internal read/write preamplifiers.

FIG. 3 illustrates still another example storage system 300 including disk-based cartridges (e.g., a disk-based cartridge 302) that do not include internal read/write preamplifiers. Rather, a read/write preamplifier 312 is located within a media player 304 that may selectively couple with each one of the storage cartridges across an interconnect 308. In one implementation, the media player 304 is adapted to selectively couple with and decouple from the disk-based cartridge 302 via the interconnect 308. In other implementations, the media player 304 is designed to couple permanently with a subset of disk-based cartridges such that all of the cartridges are permanently attached to the media player 304 but are commonly controlled by the control electronics on the media player 304.

The media player 304 is shown to include at least a read/write controller 310, a power controller 314, and a preamplifier 312. Although not shown, it is to be understood that the media player 304 includes other elements such as those described with respect to the media players of FIGS. 1-2.

The storage cartridge 302 is a disk-based storage media that includes at least one disk (e.g., a disk 316) that is accessed (read to and written from) by read/write elements on an HGA 324. Control signals traveling to and from the HGA 324 travel along electrical traces on a flex 318. In the interest of better clarifying features of the flex 318, an actuator arm is not shown in FIG. 3. However, it is to be understood that the HGA 324 is mounted at the end of an actuator arm (as shown with respect to HGA 124 on actuator arm 122 of FIG. 1) and that the flex 318 is at least partially supported by the actuator arm (e.g., the flex 318 runs along the full length of the actuator arm to the HGA 324). In one implementation, the flex 318 is a flexible thin electrical component (e.g., a film) with printed electrical traces for carrying signals between the preamplifier 312 and the HGA 324. Other aspects of the storage cartridge 302 may be the same or similar to those described with respect to FIGS. 1-2, above.

In some traditional storage devices, the preamplifier 312 is located on the flex 318 in close proximity to the HGA 324, such as at an approximate position indicated by a placeholder box 326. In these traditional designs, the flex 318 includes significantly fewer traces upstream of the preamplifier (e.g., the box 326) than that shown. For example, the preamplifier would, at the position of the box 326, receive a multiplexed signal and demultiplex the signal into several component signals. In these designs, the preamplifier 312 is in close enough proximity to the HGA 324 that it may, by virtue of its size and position, effectively absorb electrostatic discharge (ESD) along the flex 318 and protect the HGA 324 from damage due to ESD events. In the present design, however, the preamplifier 312 is displaced to the external media player 304 and therefore cannot protect the HGA 324 from ESD on the flex 318.

Electrostatic charge is most likely to be induced along the traces of the flex 318 as a result of inadvertent contact between electrical leads at the interconnect 308 and objects or substances in the surrounding environment. To protect the HGA 324 from damage due to electrical charge that may accumulate on the flex 318, the flex 318 is electrically coupled to an electrical shunt mechanism 328 that resistively grounds the electrical traces on the flex 318 until a secure connection is fully established at the interconnect 308 between the media player 304 and the storage cartridge 302. By ensuring the electrical traces on the flex 318 are grounded until this connection is complete, the HGA 324 is protected from ESD events. The electrical shunt mechanism 328 may include different components and assume a variety of different forms in different implementations.

By example and without limitation, the shunt mechanism 328 includes a flexible metal pin 332 that attaches the traces on the flex 318 to an electrical ground 334 whenever the storage cartridge 302 and the media player 304 are uncoupled from one another. When the media player 304 is selectively coupled to the storage cartridge 302 at the interconnect 308, a rigid pin 330 (or other protrusion, flange, etc.) engages with the flexible metal pin 332 and applies a force that pushes the flexible metal pin 332 out of initial position, thereby severing its connection to the electrical ground 334. In one implementation, this connection between the ground 334 and the traces on the flex 318 is only interrupted at a time when a secure mechanical and/or electrical connection has been established at the interconnect 308 between the media player 304 and the storage cartridge 302.

Figure 4:
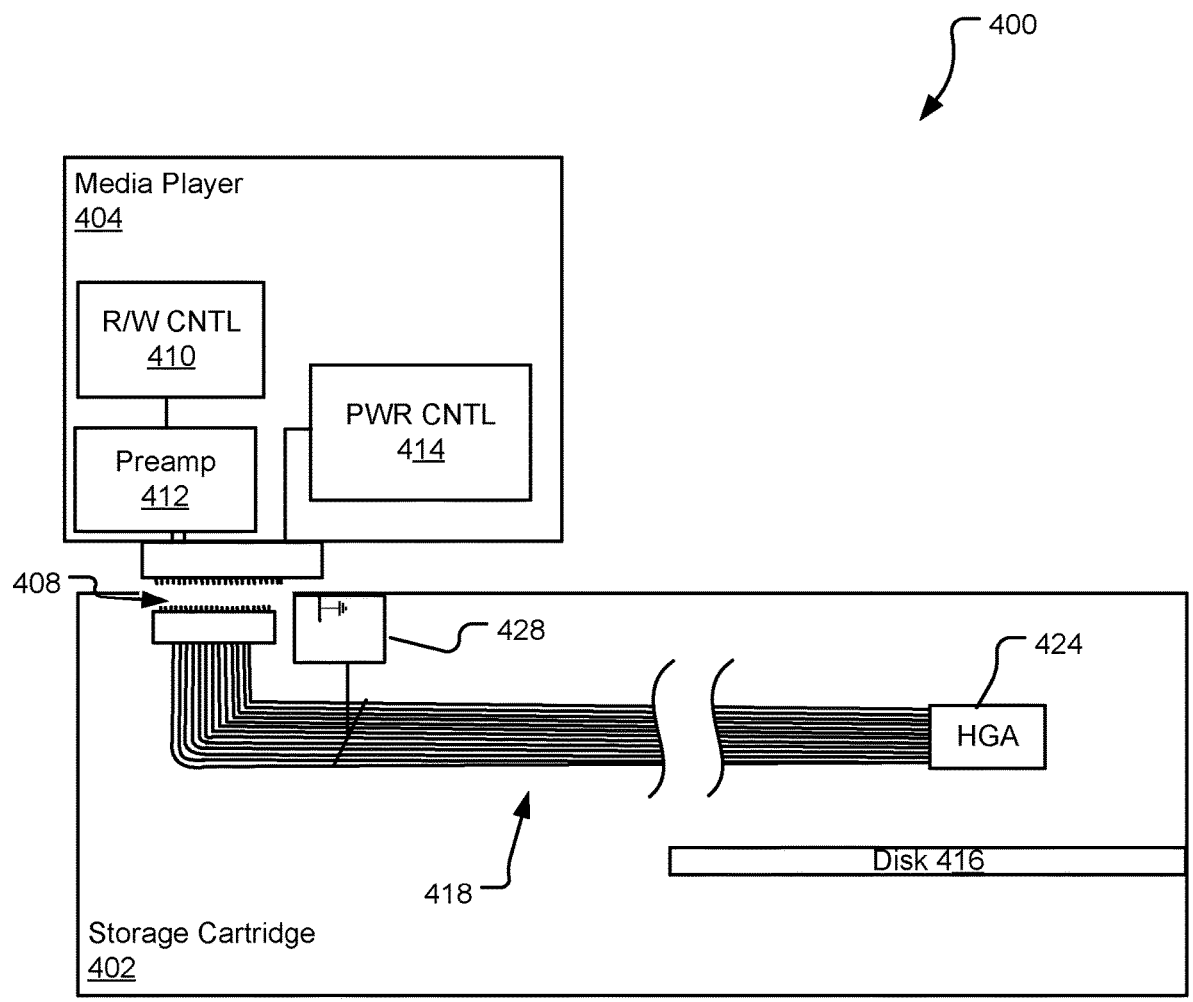
FIG. 4 illustrates still another example storage system including disk-based cartridges that do not include an internal read/write preamplifiers.

FIG. 4 illustrates still another example storage system 400 including disk-based cartridges (e.g., a disk-based cartridge 402) that do not include internal read/write preamplifiers. Rather, a read/write preamplifier 412 is located within a media player 404 that is removably couplable to each of the storage cartridges across an interconnect 408. The media player 404 is shown to include at least a read/write controller 410, a power controller 414, and a preamplifier 412. Although not shown, it is to be understood that the media player 404 may include other elements including those described with respect to the media players of FIGS. 1-2.

The storage cartridge 402 is a disk-based storage media that includes at least one disk (e.g., a disk 416) that is accessed (read to and written from) via head elements on an HGA 424. Control signals traveling to and from the HGA 424 travel along electrical traces on a flex 418. Although no actuator arm is shown in FIG. 4, it is to be understood that the HGA 424 may be mounted at the end of an actuator arm (as shown with respect to HGA 124 on actuator arm 122 of FIG. 1) such that the flex 418 is at least partially supported by the actuator arm (e.g., the flex 418 runs along the full length of the actuator arm to the HGA 424). Other aspects of the storage cartridge 402 and flex not described specifically with respect to FIG. 4 may be the same or similar to those described with respect to FIGS. 1-3, above.

In the storage system 400, the flex 418 is electrically coupled to an electrical shunt mechanism 428 that protects the HGA 424 from ESD events. In contrast with the electrical shunt mechanism 328 described with respect to FIG. 3, the electrical shunt mechanism 428 of FIG. 4 assumes the form of a switch that grounds the electrical traces on the flex 418 until a coupling between the media player 404 and the storage cartridge 402 is secure at the interconnect 408.

In one implementation, the electrical shunt mechanism 428 is a micro-electro-mechanical system (MEMS) switch. When the switch is in a closed position, the traces on the flex 418 are grounded. When the MEMS switch detects an input from the media player 404 (e.g., responsive to the establishment of a secure connection at the interconnect 408), the MEMS switch is controllably reconfigured to assume an open switch position, un-grounding the traces on the flex 418 and allowing the traces to carry received control signals from the media player 404 to the HGA 424.

In another implementation, the electrical shunt mechanism 428 assumes the form of an inexpensive preamplifier located on the flex 418 in close proximity to the HGA 424. For example, a primary stage preamplifier is included on the media player (e.g., the primary preamplifier is preamplifier 412) and a second stage preamplifier is included on the flex 418, such as in close proximity to the HGA 424 (e.g., such as in the same or similar position to preamplifiers in traditional disk-based storage devices). In this design, however, the second stage preamplifier could be a very inexpensive basic preamplifier or electronic switch that still suffices to protect the HGA 424 from ESD events. For example, the second stage preamplifier may act as the read preamplifier but not serve as the write preamplifier and/or may not serve to amplify other component signals in transit to and from the HGA 424. In this sense, the secondary preamplifier may be a read preamplifier but not a read/write preamplifier. In another embodiment, the storage cartridge 402 may not contain any amplifiers at all, but may instead consist solely of electronic switches.

In this design, the primary preamplifier on the media player 404 may provide more advanced functionality such as for writing data to the media or operating a laser (e.g., in heat-assisted magnetic devices). This solution therefore allows for a significant system cost savings because the primary (more expensive) preamplifier may be shared by multiple cartridges in a library-style storage system.

Figure 5:
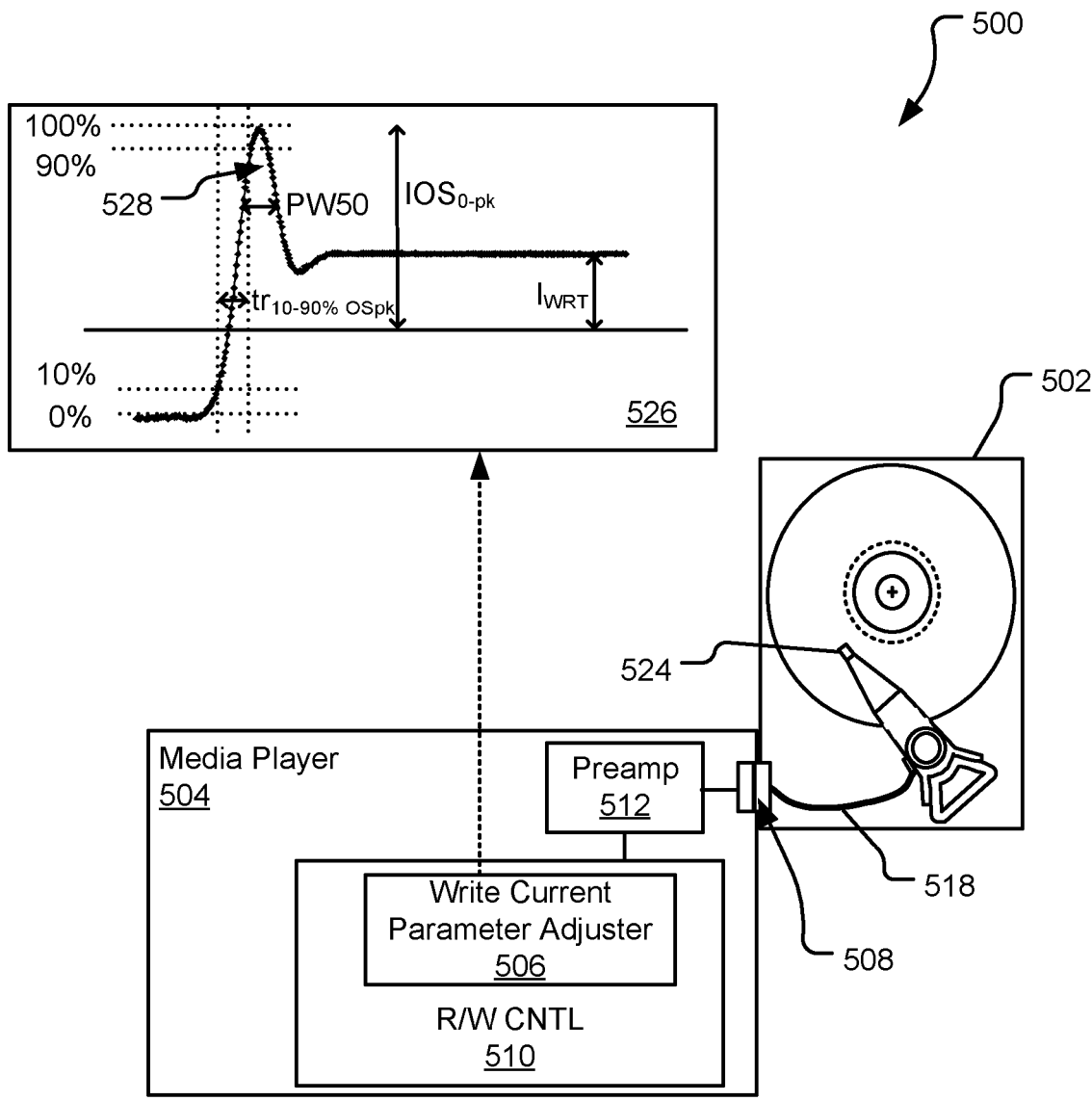
FIG. 5 illustrates aspects of still another example storage system including disk-based cartridges that do not include an internal read/write preamplifiers.

FIG. 5 illustrates aspects of still another example storage system 500 including disk-based cartridges (e.g., a disk-based cartridge 502) that do not include internal read/write preamplifiers. The system 500 includes a media player 504 that is removably couplable to each of the storage cartridges across an interconnect 508. The media player 504 includes read/write control electronics including a read/write controller 510 and a preamplifier 512. Although not shown, it may be understood that the media player 504 may include other circuitry and components the same or similar to those discussed with respect to other figures herein.

During writing operations to the media within the storage cartridge 502, the read/write controller 510 generates a digital signal that a preamplifier interprets to generate an analog write signal and to control polarity of the write signal. The analog write signal is amplified within the preamplifier and transmitted through the interconnect 508 and along a length of a flex 518 to reach a write element on an HGA 524. The write element translates the series of write current pulses into magnetic pulses of corresponding magnitude which, in turn, polarizes one or more magnetic bits on the storage media.

The read/write controller 510 includes a write current parameter adjuster 506 that may adjustably control different parameters of the write current pulses. To illustrate these parameters, an example write current pulse 526 is shown. One of these write current parameters is steady state write current amplitude ($I_{WRT}$), or the base amplitude of each write current pulse excluding an overshoot portion 528 included at the beginning of the write current pulse 526. Another of the write current parameters is overshoot amplitude ($IOS_{0-pk}$), or a positive amplitude maximum of the overshoot portion 528 of the write current pulse 526. Still another write current parameter is overshoot duration (PW50), which refers to the width of the overshoot portion 528 at 50% of the pulse amplitude (full width at half maximum or PW50). A fourth write current parameter is rise time ($tr_{10-90\% \ OSpk}$) or the time that it takes for the write current pulse 526 to initially rise between 10% and 90% of the maximum value of the overshoot portion 528.

In general, rise time ($tr_{10-90\% \ OSpk}$) is correlated with bit transition accuracy, and it is well known that high rise times correlate with higher write accuracy. When the preamplifier 512 is removed from the storage cartridge 502 and displaced to the illustrated position within the external media player 504, this decreases the rise time, which may, without correction or compensation, lead to an observed increase in write errors in excess of a correctable error margin. In one implementation of the system 500, however, the write current parameter adjuster 506 compensates for this decrease in rise time by increasing overshoot 528 of the write current pulse.

Figure 6:
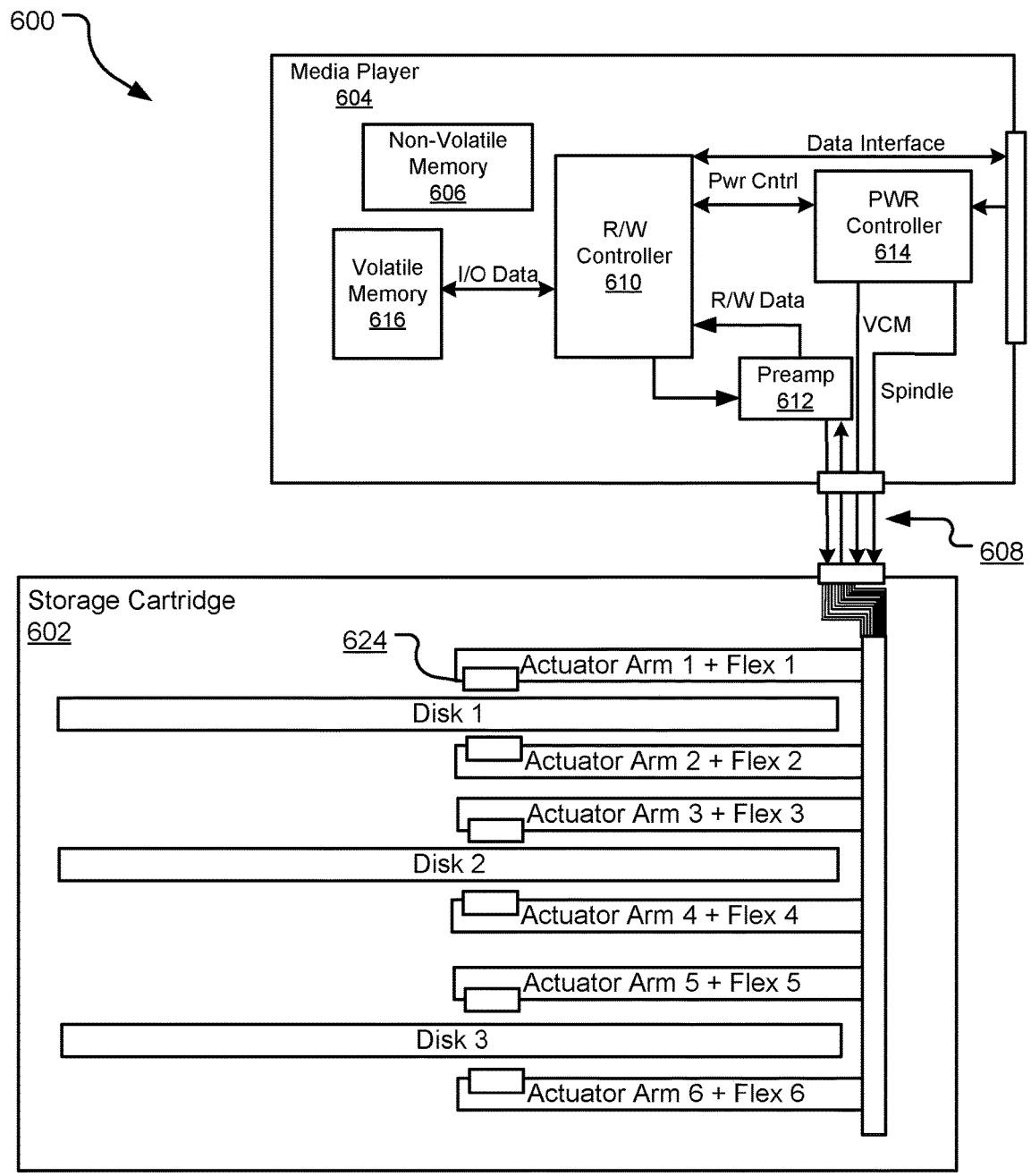
FIG. 6 illustrates another example cartridge-based storage system including storage cartridges that do not include internal read/write preamplifiers.

FIG. 6 illustrates another example cartridge-based storage system 600 including storage cartridges (e.g., a storage cartridge 602) that do not include internal read/write preamplifiers. Rather, a read/write preamplifier 612 is located within a media player 604, and the media player 604 is adapted to selectively couple with and provide data access to each of the different storage cartridges. In addition to the preamplifier 612, the media player 604 is shown to include a read/write controller 610, a power controller 614, non-volatile memory 606 and volatile memory 616. Although not shown, it is to be understood that the media player 604 may include other elements including those described with respect to the media players of FIG. 1-2.

In FIG. 6, the storage cartridge includes three different disks (disk 1, disk 2, and disk 3) and actuator arms (1-6) each supporting a corresponding HGA (e.g., an HGA 624) that is adapted to provide read/write access a different disk surface. A different flex element (e.g., flex elements 1-6) extends along each one of the different actuator arms, routing multiple electrical traces to the corresponding HGA. For example, each flex may provide a corresponding HGA with one or more micro actuator control signal(s), heater control signal(s), a read signal, a write signal, a laser signal, ground, etc.). All of the traces extend through the interconnect 608. Thus, in an example where each flex carries 13 individual traces to an associated one of six total HGAs in the storage cartridge 602, there may exist 78 total (13×6) traces that electrically couple to leads at the interconnect 608 such that all 78 electrical traces are input to the preamplifier 612. In some implementations, the storage cartridge 602 may include more than six HGAs.

In one example implementation, each flex includes read and write paths that are impedance-matched to the impedance of corresponding read and write elements to mitigate signal reflection. In the same or another implementation, the storage cartridge 602 includes an electrical shunt mechanism (e.g., as discussed with respect to FIG. 3 or 4) to protect the HGAs from ESD. In the same or another implementation, the read/write controller 610 selectively increases overshoot of outgoing write current pulses to help improve write transition accuracy to compensate for a decrease in maximum attainable rise time that is observed due to the displacement of the preamplifier 612 from the storage cartridge 602 to the media player 604.

Figure 7A:
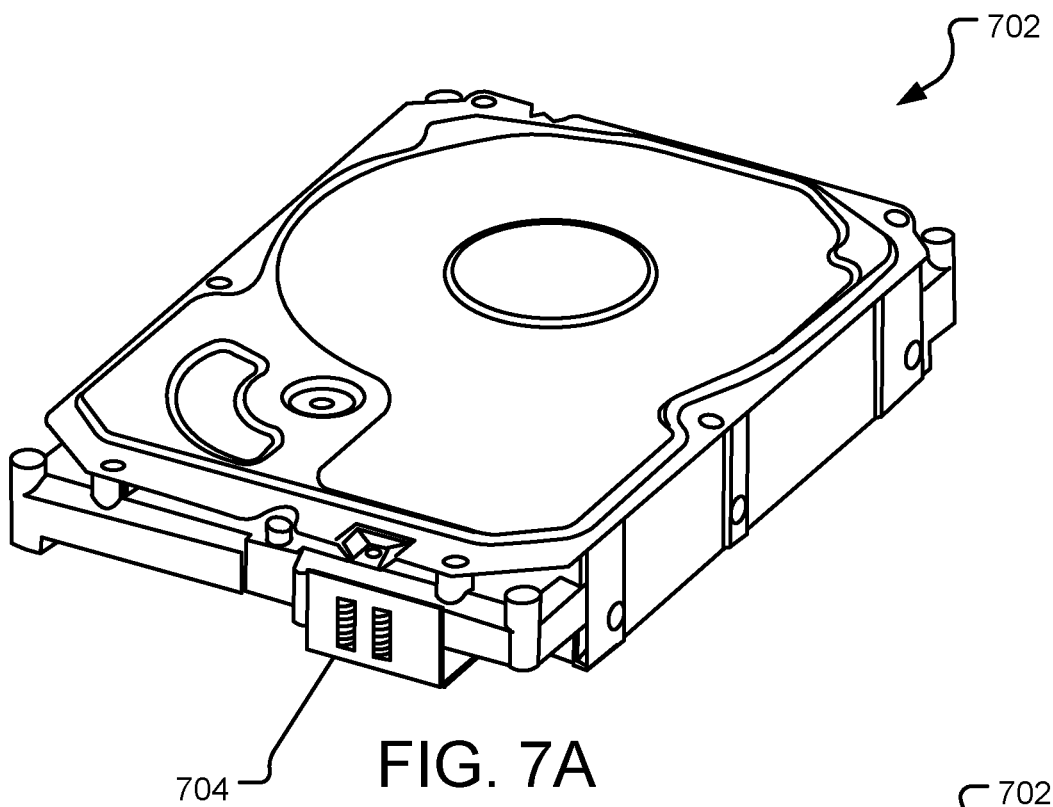
FIG. 7A illustrates a top view of an example storage cartridge that may be used to implement the herein disclosed technology.
Figure 7B:
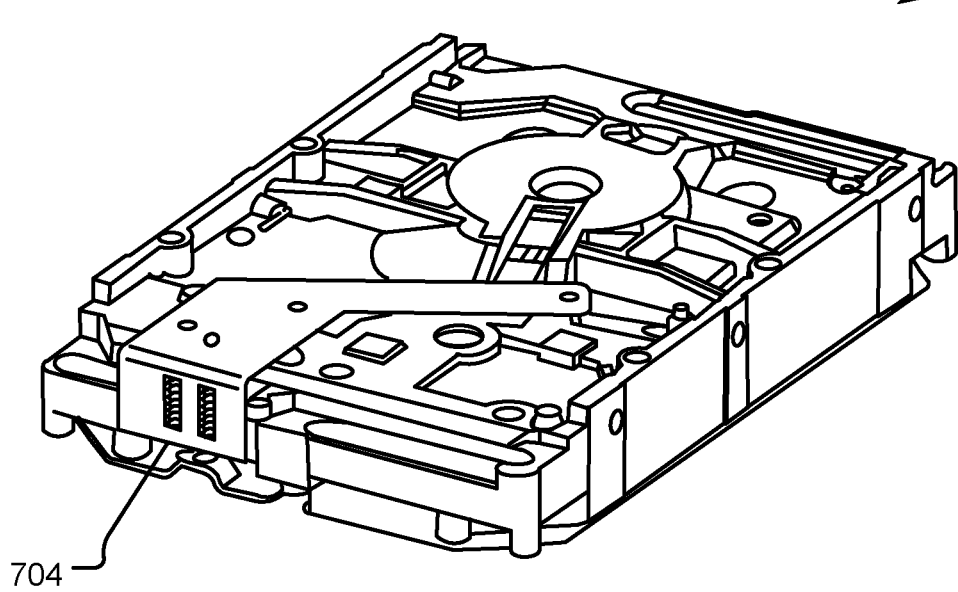
FIG. 7B illustrates a bottom view of the example storage cartridge of FIG. 7A.

FIG. 7A and FIG. 7B illustrate top and bottom views, respectively, of an example storage cartridge 702 that may removably couple with a media player as described with respect to other implementations herein. In one implementation, the storage cartridge 702 does not include an internal preamplifier for amplifying read and write signals.

The storage cartridge 702 includes a connector 704 designed to electrically mate with a corresponding connector on a media player (not shown). According to one implementation, the media player includes a preamplifier that generates and transmits analog control signals (e.g., read and write signals) across the connector 704.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A storage system comprising:
a media player including a preamplifier; and
a storage cartridge attached to the media player across an interconnect and adapted to perform data access operations responsive to signals received from the media player through the interconnect, the storage cartridge having:
a flex coupled to at least one HGA, the flex including electrical traces for routing control signals between the interconnect and the at least one HGA,
a current shunt mechanism that selectively grounds the electrical traces when the storage cartridge is uncoupled from the media player and selectively ungrounds the electrical traces when the storage cartridge is coupled to the media player,
the storage cartridge lacking an independent read/write preamplifier.

2. The storage system of claim 1, wherein the storage system includes multiple storage cartridges, each of the storage cartridges being adapted to receive analog read/write signals generated within the preamplifier of the media player.

3. The storage system of claim 2, wherein media player is adapted to selectively couple with each of the multiple storage cartridges.

4. The storage system of claim 1, wherein the flex includes one or more read traces that electrically connect a read element on the at least one HGA to the interconnect, the one or more read traces being impedance-matched to impedance of the read element to reduce reflection of read signals transmitted along the read trace.

5. The storage system of claim 1, wherein the flex includes one or more write traces that electrically connect a write element on the at least one HGA to the interconnect, the write traces being impedance-matched to impedance of the write element to reduce reflection of write signals transmitted along the write trace.

6. The storage system of claim 1, wherein the current shunt mechanism is a micro-electromechanical system (MEMS) switch.

7. The storage system of claim 1, wherein the current shunt mechanism selectively interrupts a connection between the at least one HGA and electrical ground responsive to pressure applied at the interconnect.

8. The storage system of claim 1, wherein the media player includes a read/write controller that selectively increases overshoot of a write current pulse to improve write transition accuracy.

9. A method comprising:
generating, by a preamplifier within a media player, a plurality of analog signals;
directing the analog signals across an interconnect and to a head gimbal assembly (HGA) within a storage cartridge, the storage cartridge including a flex that includes electrical traces for routing control signals between the interconnect and the HGA, the storage cartridge lacking an independent read/write preamplifier; and
selectively grounding the electrical traces when the storage cartridge is uncoupled from the media player and selectively ungrounding the electrical traces when the storage cartridge is coupled to the media player.

10. The method of claim 9, wherein the media player is adapted to provide read and write access to multiple storage cartridges that are each adapted to receive the plurality of analog signals by the preamplifier of the media player.

11. The method of claim 9, further comprising:
selectively coupling the media player to a select storage cartridge of multiple storage cartridges.

12. The method of claim 9, wherein the HGA is coupled to the flex within the storage cartridge and the flex includes one or more read traces electrically connecting a read element on the HGA to the interconnect, the one or more read traces being impedance-matched to impedance of the read element to reduce reflection of read signals transmitted along the read trace.

13. The method of claim 9, wherein the HGA is coupled to the flex within the storage cartridge and the flex includes one or more write traces electrically connecting a write element on the HGA to the interconnect, the one or more write traces being impedance-matched to impedance of the write element to reduce reflection of write signals transmitted along the write trace.

14. The method of claim 9, wherein selectively grounding and ungrounding the electrical traces further comprises selectively grounding and ungrounding the electrical traces using a micro-electromechanical system (MEMS) switch.

15. The method of claim 9, wherein selectively grounding and ungrounding the electrical traces further comprises selectively grounding and ungrounding the electrical traces responsive to pressure applied at the interconnect.

16. A storage system comprising:
multiple storage cartridges that each individually lack a read/write preamplifier; and
a media player adapted to selectively couple with and provide data access to each of the multiple storage cartridges, the media player including a preamplifier that amplifies and transmits analog signals across an interconnect to a select one of the storage cartridges coupled with the media player,
each of the multiple storage cartridges further having:
a flex including electrical traces for routing control signals between the interconnect and an HGA in the storage cartridge, and
a current shunt mechanism that selectively grounds the electrical traces when a select storage cartridge is uncoupled from the media player and selectively ungrounds the HGA when the select storage cartridge is coupled to the media player.

17. The storage system of claim 16, wherein each of the flex includes read and write traces impedance-matched to corresponding read and write elements on the HGA.

18. The storage system of claim 16, wherein the current shunt mechanism comprises a micro-electro-mechanical system (MEMS) switch.

19. The storage system of claim 16, wherein the current shunt mechanism comprises a read-only preamplifier located on the flex.

* * * * *